(12) United States Patent
Hamana et al.

(10) Patent No.: US 6,761,456 B2
(45) Date of Patent: Jul. 13, 2004

(54) LASER PRESENTATION SYSTEM USING A LASER POINTER

(75) Inventors: Akinori Hamana, Saitama (JP); Mitsuyoshi Nishimura, Okegawa (JP); Takashi Nagashima, Saitama (JP); Junichi Yokoyama, Iwatsuki (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/383,762

(22) Filed: Mar. 10, 2003

(65) Prior Publication Data

US 2003/0179348 A1 Sep. 25, 2003

(30) Foreign Application Priority Data

Mar. 25, 2002 (JP) .......................... 2002-083541
Jun. 20, 2002 (JP) .......................... 2002-179375

(51) Int. Cl.[7] .................. G03B 21/00; F21V 33/00; G09G 5/08
(52) U.S. Cl. .................. 353/42; 362/109; 345/158
(58) Field of Search .................. 353/42, 122; 362/109, 362/118, 259; 250/205, 215; 345/156–8, 175, 180–183; 396/431

(56) References Cited

U.S. PATENT DOCUMENTS

| 4,687,918 | A | * | 8/1987 | Hughes et al. | .............. 250/205 |
| 5,268,829 | A | * | 12/1993 | Lo | .............. 362/259 |
| 6,050,690 | A | * | 4/2000 | Shaffer et al. | .............. 353/122 |
| 6,499,847 | B1 | * | 12/2002 | Yoneno | .............. 353/70 |
| 6,512,507 | B1 | * | 1/2003 | Furihata et al. | .............. 345/157 |
| 6,587,092 | B2 | * | 7/2003 | Yoneno | .............. 345/158 |
| 6,598,978 | B2 | * | 7/2003 | Hasegawa | .............. 353/42 |
| 6,698,897 | B2 | * | 3/2004 | Hamana et al. | .............. 353/42 |

FOREIGN PATENT DOCUMENTS

| JP | 2591667 | 12/1996 |
| JP | H10-4228 | 1/1998 |
| JP | 2000-321530 | 11/2000 |
| JP | 2000-321531 | 11/2000 |

* cited by examiner

*Primary Examiner*—Christopher Mahoney
(74) *Attorney, Agent, or Firm*—Arnold International; Jon W. Henry; Bruce Y. Arnold

(57) ABSTRACT

A presentation system for a presenter to safely point out parts of an image projected from a projector onto a screen with laser light projected from a laser pointer held by the presenter is disclosed. The presentation system includes one or more infrared light receiving units on the laser pointer that selectively receive infrared signals from sending units that are mounted on the projector or on walls in order to control emission of laser light from the laser pointer. Arrangements of the sending and receiving units are designed to allow emission of the laser light from the pointer only when the laser pointer is pointed toward the projection screen. A control unit in the laser pointer may determine if the laser pointer is pointed correctly or a gravity operated shutter may further assist in preventing unsafe projection of laser light from the laser pointer.

20 Claims, 8 Drawing Sheets

LASER PRESENTATION SYSTEM USING A LASER POINTER

BACKGROUND OF THE INVENTION

In presentations where images are projected onto a screen using a projection device, such as a liquid crystal projector, and various presentations and explanations are given to an audience with reference to changing projected images, a laser pointer is often used to point out a specific part of a projected image. However, the laser light emitted by laser pointers is dangerous if it directly enters a human eye. Therefore, various safety measures have been proposed for preventing the laser light from being accidentally directly projected into the eye of someone in the audience. For example, Japanese Laid-Open Patent Application H10-04228 describes a laser presentation system using a laser pointer where projected laser light is automatically turned ON/OFF according to the brightness of the laser light projection object, such as a projection screen, and the laser light is projected only when the brightness exceeds a certain threshold value. However, using the safety measures described in that published Japanese patent application, depending on the illumination of the room, there may be places other than on the projection screen where the brightness exceeds the threshold value and the laser light might be projected to the audience in those places.

Additionally, Japanese Laid-Open Patent Application 2000-321530 describes a laser presentation system using a laser pointer where the angle of projected laser light in the vertical or horizontal direction is detected and the laser light is projected only when the angle is within a specified range. However, as described in that published Japanese patent application, depending on the arrangement of the audience, for example, when stadium seating or second floor seating is used, parts of the audience may be at projection angles where laser light is emitted, resulting in laser light directly reaching people in the audience. Also, in both laser systems described above, the configuration and settings required of the laser pointers may be complicated, thereby increasing costs of the laser presentation systems.

Also, Japanese Patent No. 2591667 describes a laser presentation system using a laser pointer with an infrared emitter placed, for example, on top of a projection screen and laser light projection of the laser pointer is only enabled when radiation from the infrared emitter is detected by the laser pointer. However, when the laser pointer is directed toward an audience, there is a possibility of a malfunction in which the laser pointer receives infrared radiation emitted from the infrared radiation emitter that is reflected by the projector or the audience. Also, because laser light is projected even when the presenter is located behind the projector, namely on the audience side of the projector, laser light may be projected to an audience member who is on the screen side of the presenter. Also, because the infrared radiation emitter is placed in the laser light projection direction, it is easily subjected to a limitation of locations where it can be installed, and thus its installation and the adjustment of the infrared radiation emission direction becomes difficult.

Additionally, Japanese Laid-Open Patent Application 2000-321531 describes a laser presentation system with a laser pointer where infrared radiation is projected from a laser pointer in the same direction as the laser light. Whether the infrared radiation is projected onto the screen or not is determined by an imaging device, such as a CCD, and only when the infrared radiation is properly imaged is a signal issued that enables laser light projection by the laser pointer. However, when the laser pointer is directed toward an audience, infrared radiation emitted by the laser pointer may directly hit a part of the imaging device and mistakenly be recognized as a reflection from the screen. Also, the scale of the system tends to be large and laborious adjustments of the system, such as positioning the imaging device relative to the screen, tend to make the system impractical. Also, in the same way as with the prior art system described immediately previously, because laser light is projected even when the presenter is located behind the projector, laser light may be projected to an audience member who is on the screen side of the presenter.

BRIEF SUMMARY OF THE INVENTION

The present invention is related to laser presentation systems using a laser pointer that are of simple configurations and that prevent unsafe projection of a laser beam of the laser pointer directly toward an audience.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Embodiments 1–5 of laser presentation systems that variously use laser pointers of first, second, and third embodiments will now be individually described with further reference to the drawings. In the following descriptions, structural elements that are the same in the various embodiments may be represented by the same reference symbols, and the explanations of those structural elements, once presented, may not be repeated.

Embodiment 1

Figure 1:
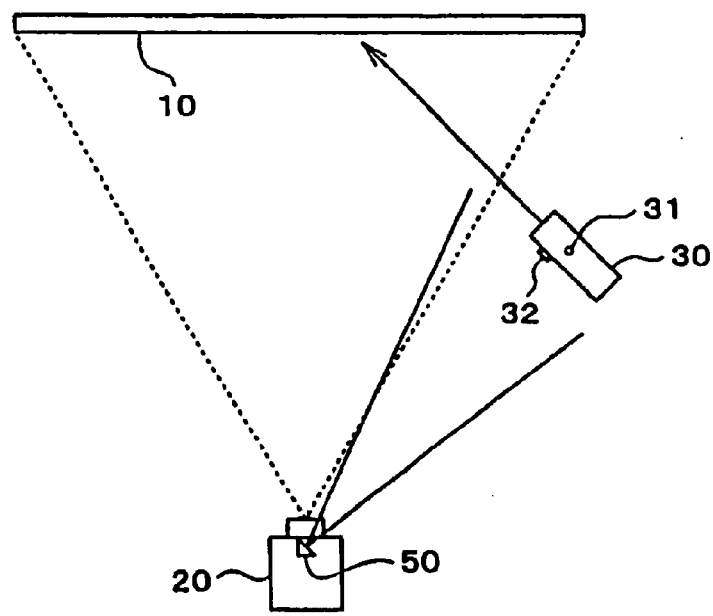
FIG. 1 shows a plan view of a laser presentation system of Embodiment 1 using a laser pointer of a first embodiment.

FIG. 1 shows a plan view of a laser presentation system of Embodiment 1 of the present invention using a laser pointer of a first embodiment. As shown in FIG. 1, the laser presentation system includes a screen 10 and a liquid crystal projector 20 that projects images onto the screen 10. A presenter (not shown) stands on the right side of the liquid crystal projector 20 and directs laser light from a laser pointer 30 to the screen 10, for example, by holding the laser pointer 30 in his hand and moving his hand, to point out features of an image displayed on the screen 10. The position of the presenter is about forty-five degrees to the screen and to a line connecting the liquid crystal projector 20 to the center of the screen 10, with the liquid crystal projector 20 placed on the left side of the presenter. Behind the presenter, that is, oil the side of the presenter opposite to the screen 10, is seating for an audience to view the screen 10.

The laser pointer 30 has a thin, rectangular, parallelepiped-shape and is held in the hand of the presenter when in use. The laser pointer 30 includes a push-type laser light projection switch 31 (hereinafter laser switch 31) on its top portion, near the front, that normally faces up. On the left side of the laser pointer 30, under this normal state of use, a detector receiving unit that detects infrared radiation of a specific wavelength (hereinafter referred to as 'detector 32') is installed. The detector 32 is installed on the side of the laser pointer that is to the left of the laser switch 31 where it will be exposed (i.e., not covered by one's hand) for detecting a laser light permission signal from a direction to one side of the laser pointer when the laser pointer is held in the normal state of use.

Figure 2:
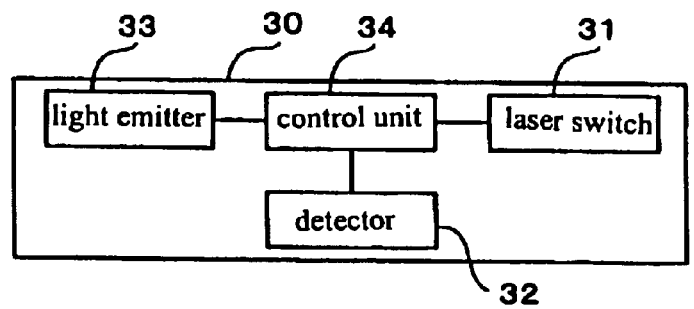
FIG. 2 shows a schematic block diagram of the electrical connections of elements of the laser pointer of FIG. 1.

FIG. 2 shows a schematic block diagram of the electrical connections of elements of the laser pointer 30. As shown in FIG. 2, the laser pointer 30 includes, along with the laser switch 31 and the detector 32, a laser light emitter 33 with a lens, and a control unit 34. In the laser pointer 30, when the detector 32 receives infrared radiation of a specific wavelength emitted from an infrared sending unit 50 (FIG. 1), which will be described later, the received radiation is converted to an electrical signal by the detector 32 and sent to the control unit 34. If the laser switch 31 is pressed (turned On), a switch On signal is supplied to the control unit 34, and if this is done while the control unit is receiving a signal from the detector 32, the control unit 34 drives the laser light emitter 33, and laser light is projected from the laser pointer 30. Only when both the laser switch 31 is On and the detector 32 is receiving infrared radiation will the laser light be projected from the laser pointer 30.

Figures 3A, 3B, 3C:
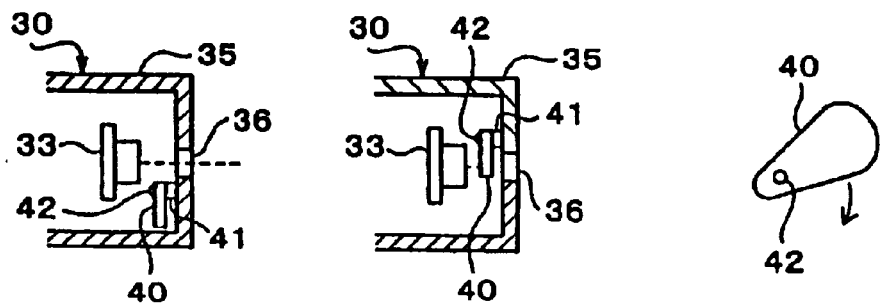
FIGS. 3A and 3B show cross-sectional views of the emitting end of the laser pointer of FIG. 1.
FIG. 3C is a front view of a shutter shown in cross-section in FIGS. 3A and 3B.

FIGS. 3A–3B show cross-sectional views of the emitting end of the laser pointer 30, and FIG. 3C is a front view of a shutter shown in cross-section in FIGS. 3A and 3B. As shown in FIG. 3A, the laser light emerges from the laser light emitter 33 through a projection window 36 installed in a casing 35 of the laser pointer 30. Also shown in FIG. 3A, a shutter 40 is installed inside the casing 35. As shown in FIG. 3B, the shutter 40 blocks the laser light emitted from the laser light emitter 33 when the laser pointer 30 is held with the top portion and bottom portion reversed, namely upside down. As shown in FIGS. 3A and 3C, this shutter 40 is an opaque thin plate formed in a teardrop shape, with the small diameter end supported so as to be freely rotatable via a pin 42 and a supporting unit 41 that is fixed to the internal face of the casing 35. When the laser pointer 30 is held in the normal state of use with its top portion up, as shown in FIG. 3A, the shutter 40 is positioned below the laser light emitter 33, and laser light is emitted through the projection window 36. However, when the laser pointer is held upside down, as shown in FIG. 3B, the shutter 40 rotates downward by its own weight so as to block the optical path of the laser light, and thus the laser light is not projected out of the laser pointer 30.

As shown in FIG. 1, installed in the liquid crystal projector 20 is an infrared sending unit 50 that emits infrared radiation toward the presenter. The infrared radiation emitted from the infrared sending unit 50 is a laser light permission signal intended to be received by the detector 32 of the laser pointer 30 held by the presenter. Therefore, the horizontal direction pointing angle of the infrared radiation emitted from the infrared sending unit 50 is set within a range where the infrared radiation can be received by the detector 32 of the laser pointer 30 even if the presenter moves somewhat forward or backward.

In the presentation system of Embodiment 1, a presentation is given while infrared radiation is emitted from the infrared sending unit 50 toward the direction of the presenter. Namely, the presenter holds the laser pointer 30 in the normal state of use with the top side up, points it toward the screen 10, and presses the laser switch 31. Because the left side of the laser pointer 30 faces the infrared sending unit 50, the detector 32 installed on the left side of the laser pointer receives the infrared radiation emitted from the infrared sending unit 50. By the laser switch being On and the detector 32 receiving the infrared radiation, which is the laser light permission signal, the control unit 34 inside the laser pointer 30 drives the laser light emitter 33. Through this, the laser light is projected from the laser pointer 30 onto the screen 10, and the presenter can give a presentation by pointing to projected images with a laser light spot projected on the screen 10.

If the laser pointer 30 is turned so as to be directed toward the audience in back of the presenter and away from the screen 10, because the detector 32 will then be positioned out of view of the infrared sending unit 50 as a result of being blocked by the laser pointer 30 itself, the detector 32 does not receive infrared radiation. Thus, the control unit 34 stops driving the laser light emitter 33, and projection of the laser light stops.

As described above, only in the normal state of a presentation where the presenter faces the screen 10 and the left side of the laser pointer 30 faces the infrared sending unit 50, is the laser light projected from the laser pointer 30 onto the screen 10. Therefore, if the laser pointer 30 is turned to direct laser light backward toward the audience, the laser light is not projected, which prevents unsafe projection of a laser beam directly toward an audience. This presentation system, where an infrared sending unit 50 is placed on or near a liquid crystal projector 20 on the left side of a presenter and a detector 32 is installed on a laser pointer 30, is a simple configuration that allows laser projection only when the detector 32 receives infrared radiation. The simplicity of the presentation system allows construction of the presentation system to be inexpensive.

If the presenter mistakenly holds the laser pointer 30 upside down and points it to the screen 10, the detector 32 will be located on the right side as viewed from behind the laser pointer 30 so that the laser pointer 30 itself blocks the infrared radiation from the infrared sending unit 50 directed toward the detector 32. If the laser pointer 30 is then turned to be directed backward so as to direct laser light toward the audience, because the detector 32 is on the side of the laser pointer 30 that now faces the infrared sending unit 50, the detector 32 receives infrared radiation. If the laser switch 31 is pressed in that state, the laser light emitter 33 is driven. However, because the laser pointer 30 is turned upside down, the shutter 40 rotates downward by its own weight to cover the front of the laser light emitter 33 so as to block the optical path of the laser light, as shown in FIG. 3B, so that the laser light is not projected from the laser pointer 30. Therefore, the laser light is not projected toward the audience. In this way, in the presentation system of Embodiment 1, even when the position of the detector 32 is changed by turning the laser pointer 30 upside down, the danger of the laser light being projected directly toward the audience is prevented.

Figures 4A, 4B, 4C, 4D:
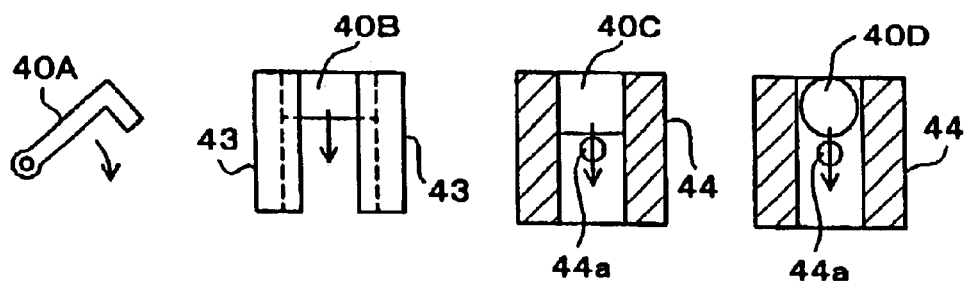
FIGS. 4A–4D show variations of shutter mechanisms for blocking laser light emitted from the laser pointer of FIG. 1.

Shutter 40 in FIGS. 3A and 3B is only one example of a shutter for blocking the optical path of the laser light when the laser pointer 30 is turned upside down. FIG. 4A shows a front view of an L-shaped shutter 40A that may pivot to perform the same function as shutter 40. FIG. 4B shows a front view of a shutter 40B that is a thin plate having a rectangular shape and supported such that it is freely movable up and down along guides 43,43 on both sides so as to perform the shutter function. FIG. 4C shows a cross-sectional view of a shutter 40C that has a cylindrical shape and that is movable up and down along a cylindrical guide 44 so that, in one position of the shutter 40C, a hole 44a in the guide 44 allows laser light to pass. FIG. 4D shows a shutter 40D, that is similar to shutter 40C of FIG. 4C, but that has a spherical shape. The various shutter arrangements of FIG. 3 and FIGS. 4A–4D provide for movement of the shutters 40 or 40A–40D so that, when the laser pointer 30 is held in its normal upright state, laser light may be projected, but when the laser pointer is turned upside down, the shutter moves due to its own weight so as to block the optical path of the laser light.

Although the shutters 40 and 40A–40D rely on directly blocking the emitted laser light, alternatively a mechanism that emits an electrical signal that turns off the driving circuit of the laser light emitter 33 when the laser pointer 30 is turned upside down can be used to prevent projection of the laser light. For generating a signal for turning off the driving circuit, a photosensor, which is generally used as an optical sensor, is preferable. In that case, the configuration is made so that the driving circuit of the laser light emitter 33 is turned Off if the optical path of the photosensor is blocked, and a shutter may be used that moves by its own weight in the same way as the shutters 40 and 40A–40D move, to block the optical path of radiation to the photosensor when the laser pointer 30 is turned upside down.

Figure 5A:
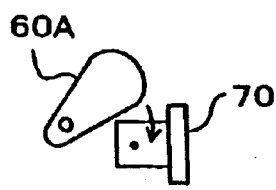
FIG. 5A shows a front view of a shutter arrangement for blocking a photosensor in the laser pointer of FIG. 1.
Figure 5B:
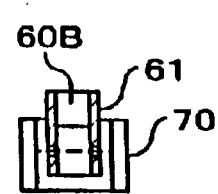
FIG. 5B shows a cross-sectional view of another shutter arrangement for blocking a photosensor in the laser pointer of FIG. 1.

FIGS. 5A and 5B show two embodiments of mechanisms for blocking radiation to a photosensor. These mechanisms may be used to disable the driving circuit of the laser light emitter 33. As shown in FIG. 5A, the optical path of a photosensor 70 is blocked with a shutter 60A that is similar to the shutter 40 shown in FIGS. 3A and 3B. Alternatively, as shown in FIG. 5B, the optical path of the photosensor 70 is blocked with a cylindrical shutter 60B that is freely movable up and down in a cylindrical guide 61. The cylindrical guide 61 includes holes that allow infrared radiation to pass to the photosensor 70 when the cylindrical shutter 60B does not block the infrared radiation. Because a small photosensor can be used, the mechanisms of FIGS. 5A and 5B can be made smaller than the mechanisms where the laser pointer output light is directly blocked, as described above.

Embodiment 2

Figure 6:
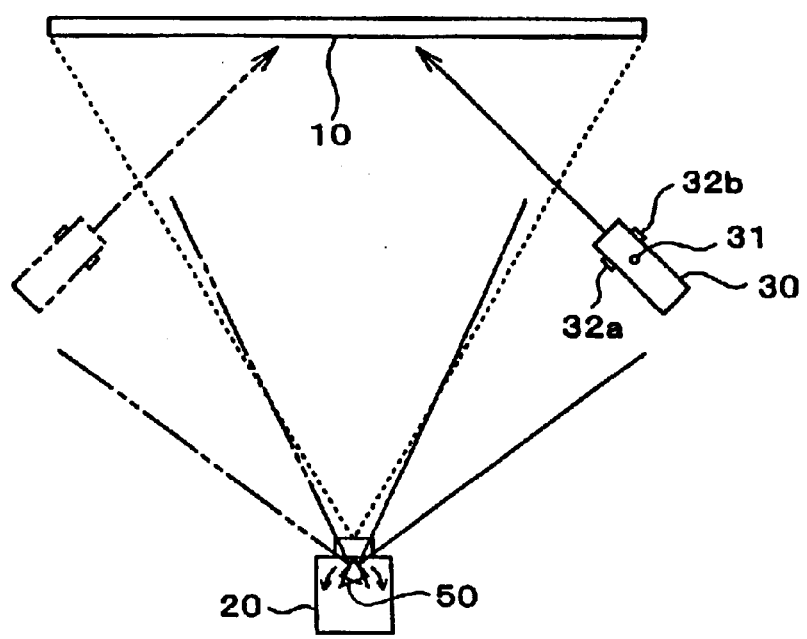
FIG. 6 shows a plan view of a laser presentation system of Embodiment 2 using a laser pointer of a second embodiment.

FIG. 6 shows a plan view of a laser presentation system of Embodiment 2 of the present invention using a laser pointer of a second embodiment of the present invention. As shown in FIG. 6, the infrared sending unit 50 is rotatable, by appropriate mechanisms, to emit infrared radiation in a direction either left or right of a line connecting the liquid crystal projector 20 with the center of the screen 10. This flexibility in the emission direction of the infrared sending unit 50 allows a presenter to stand on either the left or right side of the infrared sending unit 50 while giving a presentation, with the infrared sending unit 50 rotated appropriately toward the direction where the presenter stands.

Figure 7:
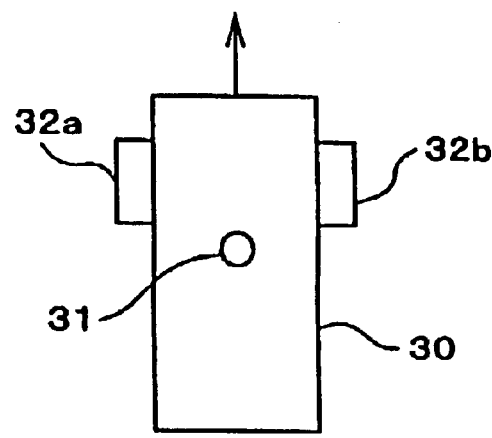
FIG. 7 shows a plan view of the laser pointer of FIG. 6.

FIG. 7 shows a plan view of the laser pointer of FIG. 6. As shown in FIGS. 6 and 7, a laser pointer 30 includes detectors (receiving units) 32a and 32b on the left and right sides. The detector that is active to detect radiation is selected by a switch (not shown) so that only the detector that is on the side where the infrared sending unit 50 is emitting infrared radiation, which is the laser light permission signal, is active, and the detector on the other side does not function. Namely, when the presenter stands on the right side of the projector, the infrared sending unit 50 is directed to the right, and the left side detector 32a of the laser pointer 30 that faces the in fared sending unit 50 is active, and the right side detector 32b is not active. On the other hand, when the presenter stands on the left side of the projector, the infrared sending unit 50 is directed to the left, and the right side detector 32b of the laser pointer 30 that faces the infrared sending unit 50 is active, and the left side detector 32a is not active. In this way, by arranging so that the detector on the side where infrared radiation is not received does not function, even if the laser pointer 30 is directed backward, because the detector that faces the infrared sending unit 50 in that case does not function, projection of the laser light to the audience is prevented.

Embodiment 3

Figure 8:
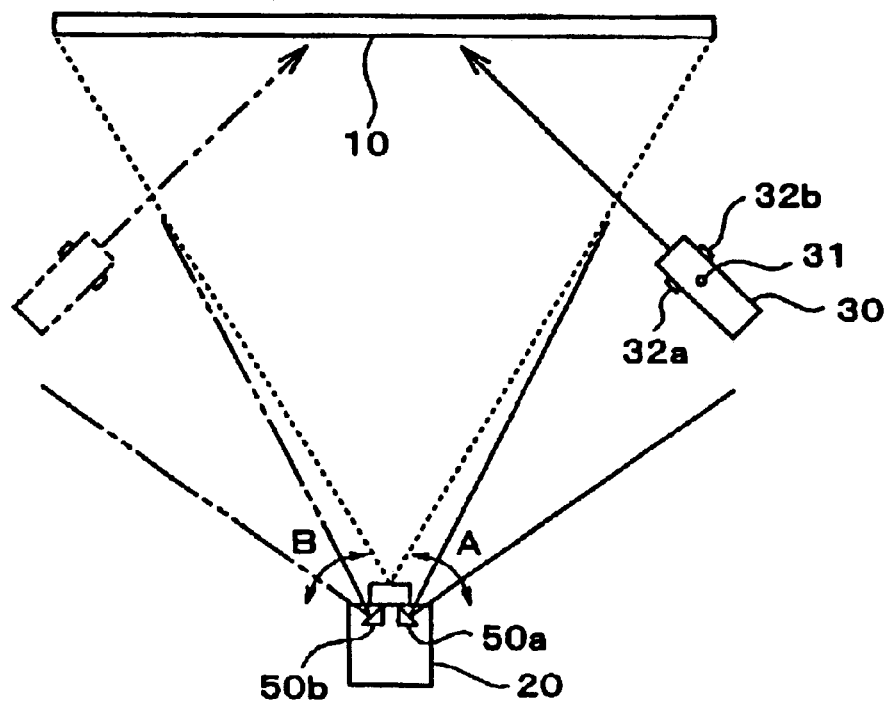
FIG. 8 shows a plan view of a laser presentation system of Embodiment 3 using a laser pointer of the second embodiment.

FIG. 8 shows a plan view of a laser presentation system of Embodiment 3 of the present invention using a laser pointer of the second embodiment. As shown in FIG. 8, one infrared sending unit 50a is installed on the right side of the liquid crystal projector 20 and one infrared sending unit 50b is installed on the left side of the liquid crystal projector 20. Infrared radiation is emitted toward the right from the right side infrared sending unit 50a, and infrared radiation is emitted toward the left from the left side infrared sending unit 50b. The infrared sending units 50a and 50b are rotatably mounted on the liquid crystal projector 20 so that they face generally right and left directions, respectively, relative to the screen 10. They are installed so as to be rotatable in the left-right directions as indicated by the double-headed arrows shown in FIG. 8, and are designed so that the reception range of the infrared radiation can be adjusted according to the position of the presenter. Then, from the infrared sending unit on the side of the projector where the presenter stands, infrared radiation is emitted toward the presenter. In this case, as in Embodiment 2, using a laser pointer 30 that is equipped with detectors 32a and 32b on the left and right sides, respectively, the detector on the side where the infrared radiation is to be received can be selected by a manual switch (not shown).

Also, if detectors 32a and 32b are installed on the left and right sides of the laser pointer 30, in place of the manual switch for switching between the detectors 32a and 32b, the detector on the side to be used can be automatically switched by automatic signal recognition. To do so, different infrared radiation coded signals, that is, different laser light permission signals, are continually emitted from the right and left infrared sending units 50a and 50b, as in a general use remote controller, and the configuration is made so that each of the left and right detectors 32a and 32b of the laser pointer 30 detect a selected, different, infrared radiation signal. Namely, only infrared radiation of signal A is emitted from the right side infrared sending unit 50a, only infrared radiation of signal B is emitted from the left side infrared sending unit 50b, the left side detector 32a of the laser pointer 30 detects only the signal A, and the right side detector 32b detects only the signal B. In this way, when the presenter stands facing the screen 10 with the laser pointer 30 in its upright position and directed toward the screen 10, the left detector 32a or the right detector 32b detects the proper signal to enable laser light to be projected. However, if the laser pointer 30 is maintained upright and is pointed backward, because neither the detector 32a nor the detector 32b can detect a signal emitted by the infrared sending units 50a and 50b, laser light is not projected. This prevents unsafe projection of a laser beam of the laser pointer directly toward an audience seating area.

Embodiment 4

Figure 9:
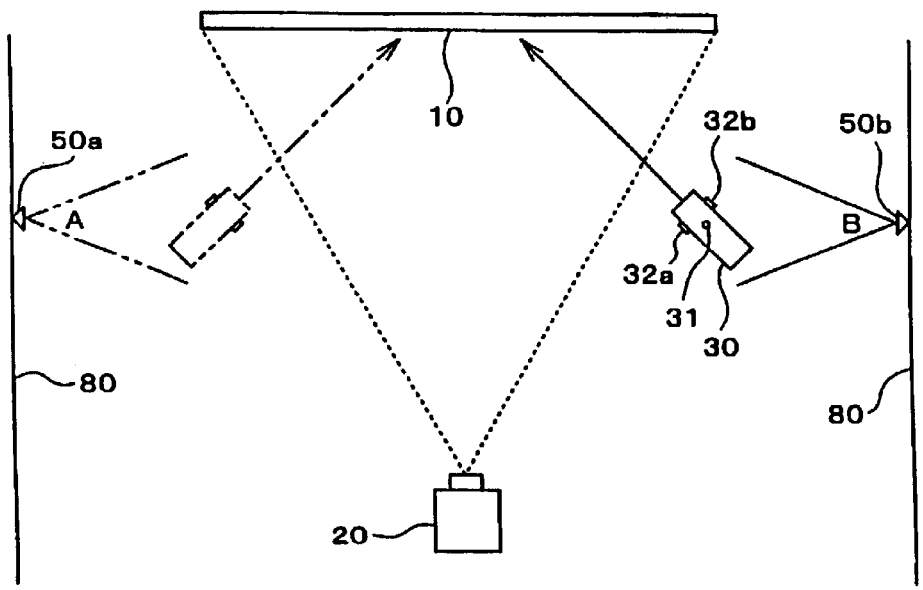
FIG. 9 shows a plan view of a laser presentation system of Embodiment 4 using a laser pointer of the second embodiment.

FIG. 9 shows a plan view of a laser presentation system of Embodiment 4 of the present invention using the laser pointer of the second embodiment. As shown in FIG. 9, infrared sending units 50a and 50b that emit different laser light permission signals toward the presenter are placed on the left and right walls 80,80 of the presentation hall. The infrared sending units 50a and 50b emit infrared radiation with different signals, as discussed with regard to Embodiment 3 above. A laser pointer 30 equipped with left and right detectors (receiving units) 32a and 32b corresponding to the sending units is used. Namely, an infrared radiation signal A is emitted from the left side infrared sending unit 50a, and an infrared radiation signal B is emitted from the right side infrared sending unit 50b. Additionally, the left side detector 32a of the laser pointer 30 detects only the signal A, and the right side detector 32b detects only the signal B. In this way, in whichever of the left and right positions that the presenter stands facing the screen 10, if the left detector 32a or the right detector 32b of the laser pointer 30 receives infrared radiation that it can detect, laser light is projected by the laser pointer. however, if the laser pointer 30 is maintained upright and is pointed backward, because neither the detector 32a nor the detector 32b can detect a signal emitted by the infrared sending units 50a and 50b, laser light is not projected. This prevents unsafe projection of a laser beam of the laser pointer directly toward an audience.

Figure 10:
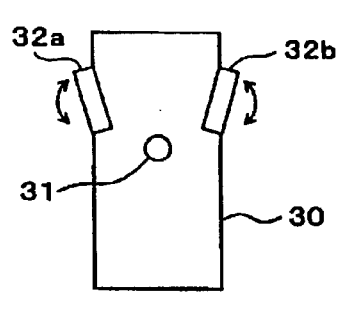
FIG. 10 shows a plan view of a first variation of the laser pointer of the second embodiment.

In Embodiment 4 of the present invention, by arranging more infrared sending units 50a and 50b along the walls 80, a greater range of positions of a presenter and a broad range of back and forth movement of a presenter can be covered. Additionally, as shown in FIG. 10, the detectors 32a and 32b of the laser pointer 30 can be made rotatable to make the infrared radiation reception angle changeable according to the relative position between the presenter and the infrared sending units. Of course, this feature of the detectors 32a and 32b being rotatable may be applied to any of the embodiments of the presentation systems and the laser pointers using two detectors as previously discussed.

Figure 11:
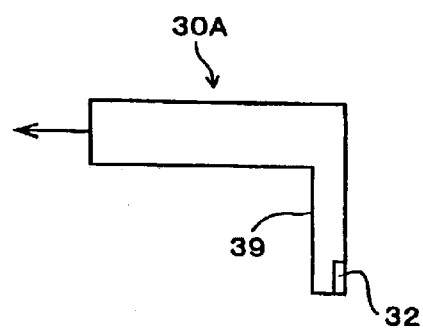
FIG. 11 shows a plan view of a second variation of the laser pointer of the second embodiment.

Alternatively, as shown in FIG. 11, instead of including a rotatable adjustment mechanism, as shown in FIG. 10, a laser pointer 30A may include a gripping section 39 for being gripped by a hand and a detector 32 on the lower end of the gripping section 39 that remains exposed when the gripping section 39 is gripped. In this case, if the infrared radiation signal that the detector 32 can receive is switched according to the position where the presenter stands, one detector 32 is sufficient.

Embodiment 5

Figure 12:
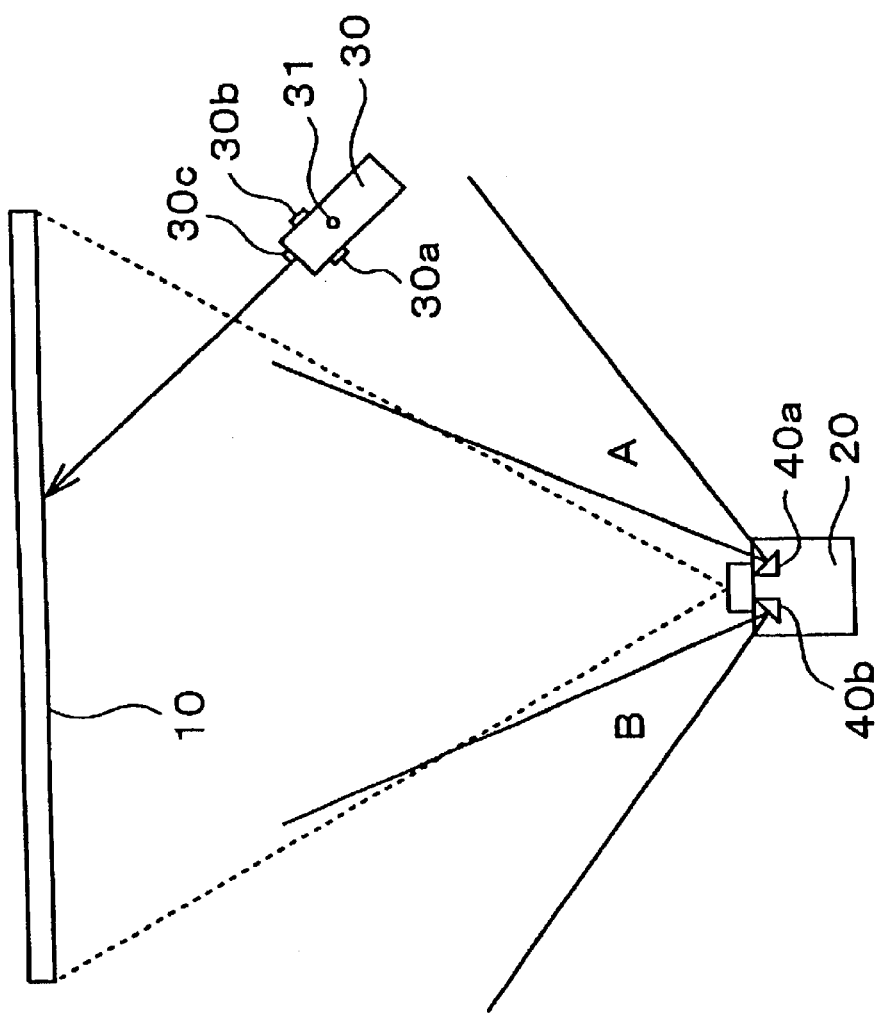
FIG. 12 shows a plan view of a laser presentation system of Embodiment 5 of the present invention using a laser pointer of a third embodiment.

FIG. 12 shows a plan view of a laser presentation system of Embodiment 5 of the present invention using a laser pointer of a third embodiment of the present invention. As shown in FIG. 12, installed oil the liquid crystal projector 20 are a right side emitter (i.e. infrared sending unit) 40a and a left side emitter (i.e., infrared sending unit) 40b that emit infrared radiation toward the presenter in an arrangement like that of Embodiment 3 discussed previously. Infrared radiation A is emitted from the right side emitter 40a to a presenter standing on the right side of the projector, and infrared radiation B is emitted from the left side emitter 40b to a presenter standing on the left side of the projector. These emitters 40a and 40b are installed to be freely rotatable in the left, right, up, and down directions so that the emission direction of infrared radiation A and B can be adjusted according to the presenter's location. Infrared radiation A and B emitted from the emitters 40a and 40b, respectively, are laser light projection permission signals, formed of infrared radiation, that are different from one another. Different infrared signals may be produced, for example, by coding the infrared radiation beams, as is done in general use remote controllers. In the following discussion, infrared radiation A that is emitted from the right side emitter 40a is called an emission signal A, and infrared radiation B that is emitted from the left side emitter 40b is called an emission signal B.

Figure 13:
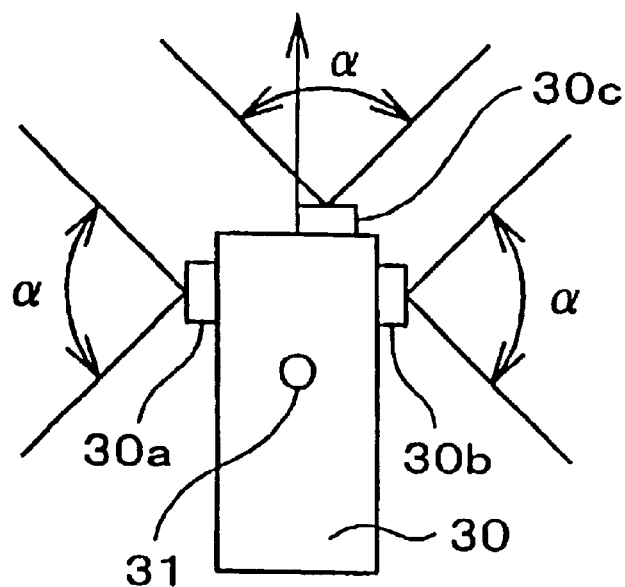
FIG. 13 shows a plan view of the laser pointer of FIG. 12.

FIG. 13 shows a plan view of the laser pointer of FIG. 12. As shown in FIG. 13, a left-side receiving unit 30a is installed on the left side of the laser pointer 30 in its normal operating state, and a right side receiving unit 30b is installed on the right side. Also, a front receiving unit 30c is installed on the front of the laser pointer 30. As in previous embodiments, these receiving units 30a, 30b, and 30c are optical photosensitive detectors with an angular spread, for example, of $\alpha = \pm 30°$.

In the normal operating state, the arrangement is such that the left side receiving unit 30a receives the emission signal A emitted from the right side emitter 40a as a laser light permission signal and the right side receiving unit 30b receives the emission signal B emitted from the left side emitter 40b as a laser light permission signal. Also, the arrangement is such that, when the front receiving unit 30c receives the emission signal A or B, even if the left and right receiving units 30a and 30b receive the respective normal signals, laser light is not projected. The left and right receiving units 30a and 30b are installed on a part that is nearer the front end of the laser pointer 30 than is the laser switch 31 so that the receiving units are exposed to the infrared radiation when the laser pointer 30 is held in its normal state of use. Also, the front receiving unit 30c is installed at the front of the laser pointer so as to be exposed to the infrared radiation in the normal state of use.

Figure 14:
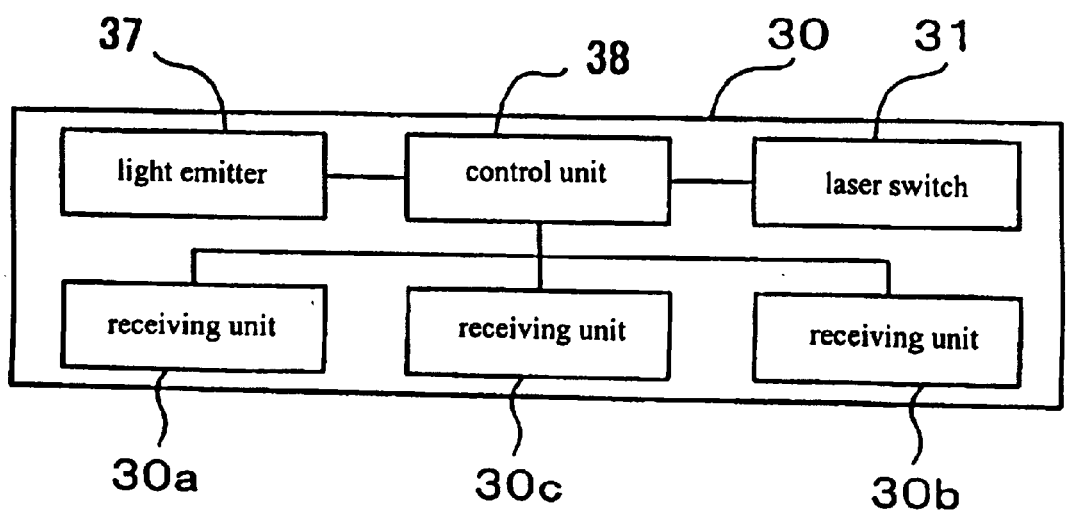
FIG. 14 shows a schematic block diagram of the electrical connections of elements of the laser pointer of FIG. 12.

FIG. 14 shows a schematic block diagram of the electrical connections of elements of the laser pointer of FIG. 12. As shown in FIG. 14, the laser pointer 30 is equipped with the laser switch 31 and left and right receiving units 30a and 30b, and is further equipped with a laser light emitter 37 which includes a lens and a control unit 38. The laser light emitter 37 is placed in the front portion of the laser pointer 30 for projecting light from the laser pointer.

The laser light emitter 37 does not emit light simply when the laser switch 31 is pressed ON. Other conditions are required to be satisfied in addition to the laser switch 31 being pressed ON in order for the laser light emitter 37 to emit light. Assuming that the laser switch 31 is ON, the laser light emitter will only emit laser light when either of the following Conditions (1) or (2) is satisfied:

Condition (1)—the left side detector 30a receives the emission signal A, and neither the right side detector 30b nor the front detector 30c receives the emission signal A; or Condition (2)—the right side detector 30b receives the emission signal B, and neither the left side detector 30a nor the front detector 30c receives the emission signal B.

As shown in FIG. 14, the control unit 38 is provided that receives signals from detectors 30a, 30b, and 30c. Based on these received signals, the control unit 38 lets the laser light emitter 37 emit light only when the laser switch 31 is ON and either Condition (1) or (2) above is satisfied.

Figure 15:
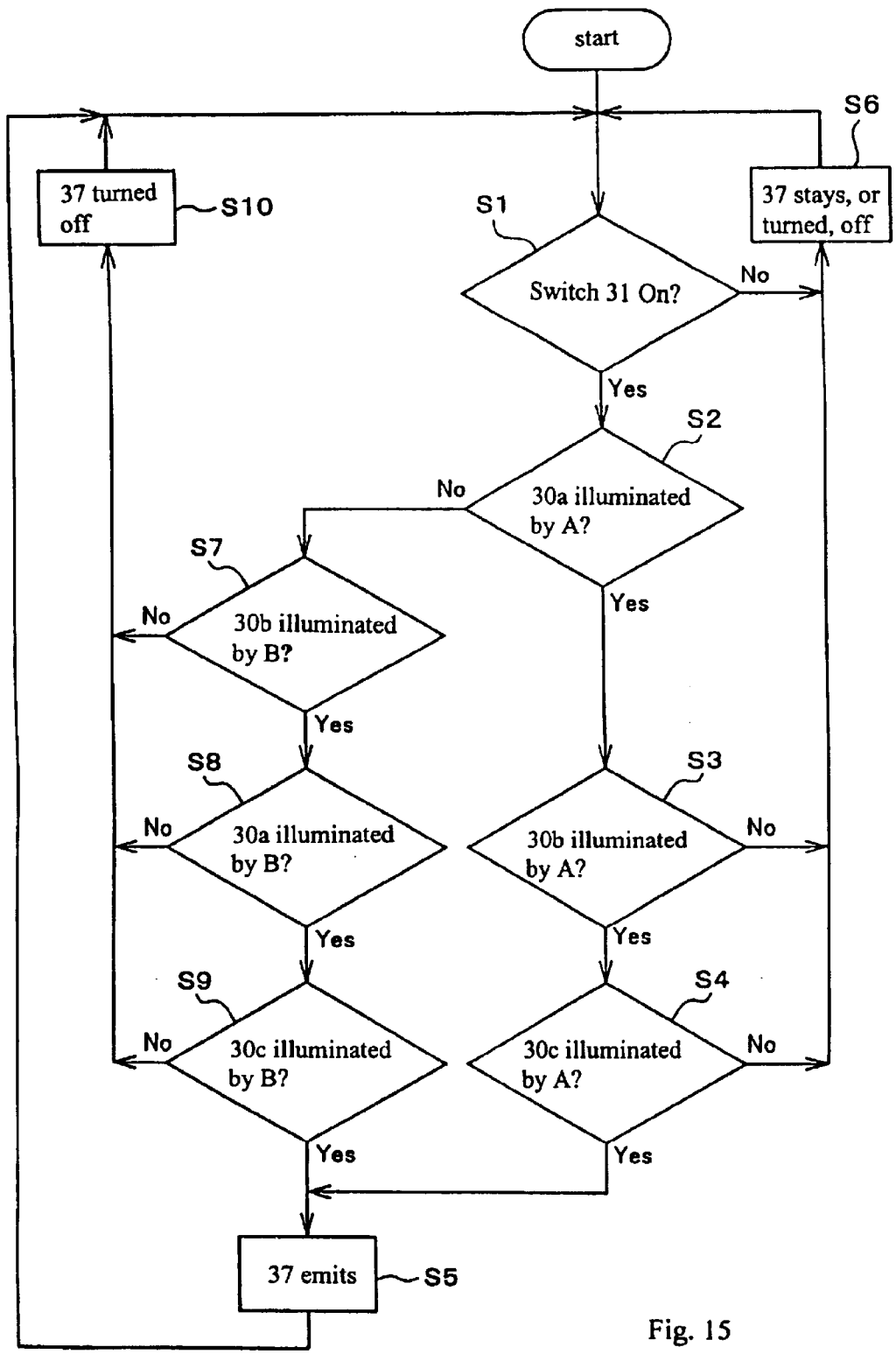
FIG. 15 shows a flow chart of a process of assuring proper projection of laser light by the laser presentation system of FIG. 12.

The operation of the laser presentation system of Embodiment 5 as described above will now be explained with reference to FIG. 15. FIG. 15 is a flow chart of a process of the control unit 38 assuring proper projection of laser light by the laser presentation system of FIG. 12. Explanations will be made separately for the case where a presenter stands on the right side of the liquid crystal projector 20 and for the case where the presenter stands on the left side. Additionally, how unsafe projection of the laser light is prevented will be explained.

When the presenter stands on the right side of the liquid crystal projector, the emission signal A is emitted from the right side emitter 40a toward the presenter. The presenter holds the laser pointer 30, directs it toward the screen 10, and presses the laser switch 31. In this state, because the left side of the laser pointer 30 is directed toward the right side emitter 40a, the left side detector 30a installed on that side receives the emission signal A emitted from the right side emitter 40a as a normal laser light permission signal. Also, at that time no signal is received by the right side detector 30b or from the left side emitter 40b.

With regard to FIG. 15, first whether the laser switch 31 is pressed ON or not is judged in step S1. If the laser switch 31 is pressed ON, whether the left side detector 30a is receiving the emission signal A or not is judged in step S2. If the left side detector 30a is receiving the emission signal A, whether the right-side detector 30b is receiving the emission signal A or not is judged in step S3. If the right-side detector 30b is receiving the emission signal A, whether the front detector 30c is receiving the emission signal A or not is judged in step S4. If the front detector 30c is receiving the emission signal A, laser light emitter 37 emits light in step S5. If the laser switch 31 is not pressed in step S1, the laser light emitter 37 maintains a state with no laser emission as shown in step S6. Also, if it is judged in step S3 that right side detector 30b is not receiving the emission signal A or if it is judged in step S4 that the front detector 30c is not receiving the emission signal A, the laser light emitter 37 is turned Off in step S6.

FIG. 12 shows the state where the presenter stands on the right side and laser light is projected from the laser pointer 30 toward the screen 10 in the normal manner. In this state, the operation according to steps S1–S5 as shown in FIG. 15 is maintained.

When the presenter stands on the left side of the liquid crystal projector 20, rather than on the right side as shown in FIG. 12, the emission signal B is emitted from the left side emitter 40b toward the presenter. In this state, because the right side of the laser pointer 30 is directed toward the left side emitter 40b, the right side detector 30b installed on that side receives the emission signal B emitted from the left side emitter 40b.

In this case, as shown in FIG. 15, if the laser switch is pressed ON, a "Yes" in step S1 and a "No" in step 52 results in proceeding to step S7. In step S7, whether the right side detector 30b is receiving the emission signal B or not is judged. If the right side detector 30b is receiving the emission signal B, whether the left side detector 30a is receiving the emission signal B or not is judged in step S8, and whether the front detector 30c is receiving the emission signal B or not is judged in step S9. If the front detector 30c is receiving the emission signal B, laser light emitter 37 emits light in step 55. If a "No' judgment is made in any one of the steps S7 to S9, the laser light emitter 37 is turned Off in step S10.

Figure 16:
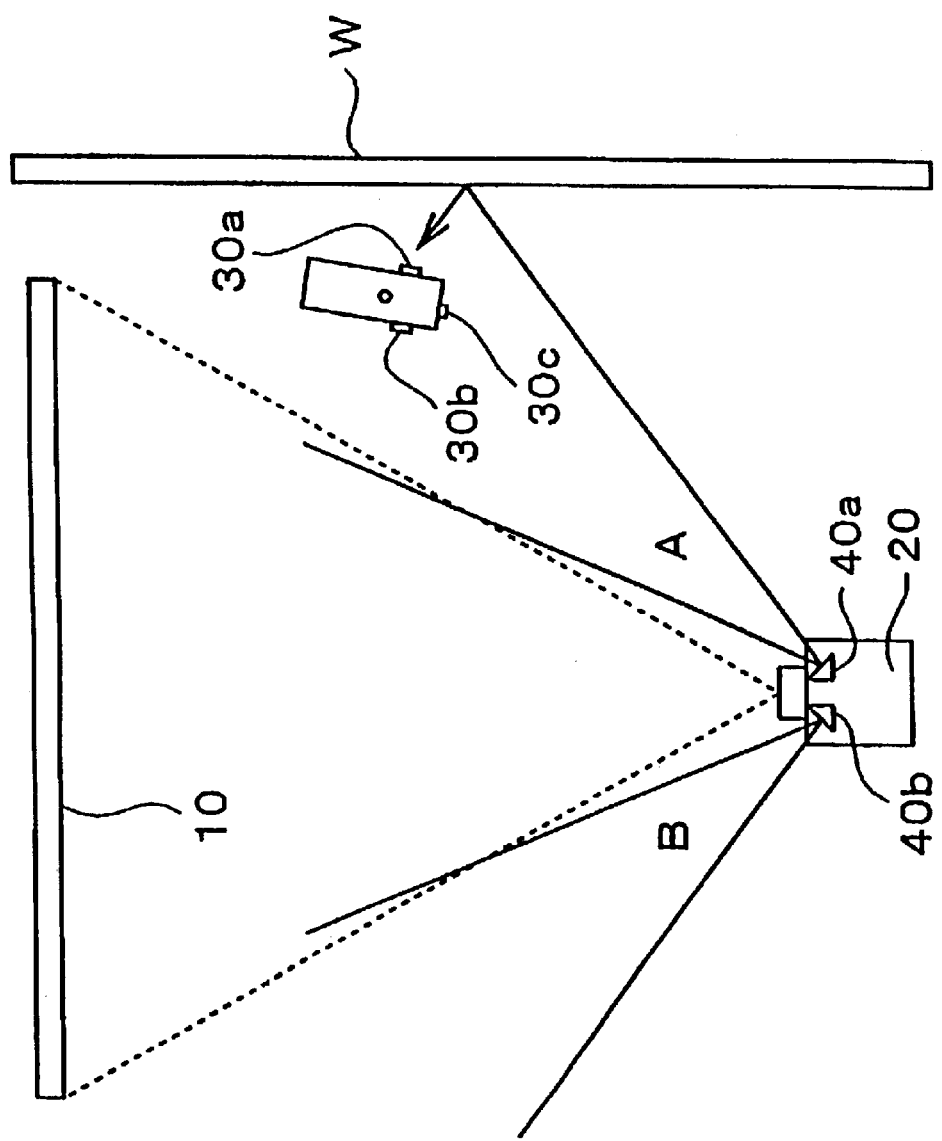
FIG. 16 shows a plan view of the laser presentation system of FIG. 12 with the laser pointer pointed in an unsafe direction.

FIG. 16 shows a plan view of the laser presentation system of FIG. 12 with the laser pointer pointed in an unsafe direction. As shown in FIG. 16, when the laser pointer 30 is directed toward the audience while the presenter stands on the right side of the projector, because the left side detector 30a is not directed toward the right side emitter 40a, a "No" judgment is made in step S2 of FIG. 15, and further because the right side detector 30b does not receive the emission signal B, a "No" judgment is made in step S7. Therefore, laser light is not projected.

As shown in FIG. 16, when, for example, there is a wall W on the right side of the liquid crystal projector 20, if the laser pointer 30 is directed toward the audience seats in the back, the emission signal A is reflected off the wall W, and the left side detector 30a may receive the emission signal A in that case. Namely, the left side detector 30a may receive the emission signal A as a normal laser light permission signal, and the step S2 becomes "Yes." However, because the emission signal A which is not supposed to be received by the right side detector 30b is received, a "No" judgment is made in the next step S3, and therefore laser light is not projected. Furthermore, although there are dead zones where the left and right detectors 30a and 30b will not receive infrared radiation, these zones are controlled by the front detector 30c, and in this case even if a "Yes" judgment is made in step S3, a "No" judgment is made in step S4, and laser light is not projected.

Therefore, in Embodiment 5 of the present invention, in a state where the laser pointer 30 is directed backward, even if the emission signal A or emission signal B is reflected by a wall, or a similar reflective obstacle, and either the left or right detector of the laser pointer 30 receives an emission signal as a normal laser light permission signal, by other detectors receiving the same laser light permission signal, emission of laser light by the laser pointer 30 is regulated. Therefore, unsafe projection of laser light to the audience can be reliably prevented. Also, because the emission signals A and B are emitted as laser light permission signals to the presenter located between the screen 10 and the liquid crystal projector 20, if the presenter is located behind the liquid crystal projector 20, no laser light permission signals are received and laser light is not projected. In this way unsafe projection of laser light to the audience can be further prevented.

Embodiment 5 of the present invention has a simple and small configuration where right and left emitters 40a and 40b are installed on a liquid crystal projector, left and right detectors 30a and 30b, which correspond to emission signals A and B, respectively, and a front detector 30c are installed on a laser pointer 30, and a control unit 38 which controls laser light projection according to the reception states of these detectors 30a and 30b and the detector 30c is installed. Therefore, reliably preventing unsafe projection of laser light can be realized inexpensively. Also, the setting of the present system is performed by adjusting the direction of the emitters 40a and 40b, directing the emission direction of the emission signals A and B to a presenter holding the laser pointer 30, until laser light projected from the laser pointer 30 is projected uniformly onto a screen 10, which call be done easily and practically with excellent results.

Although in Embodiment 5 of the present invention, a front detector 30c is installed on the laser pointer 30, if the reception angles of the left and right detectors 30a and 30b are sufficiently broad enough so that the dead zone becomes extremely narrow, the front detector 30c may be omitted. On the other hand, if the reception angles of the detectors are very narrow, multiple front detectors 30c may be installed.

The invention being thus described, it will be obvious that the same may be varied in many ways. For example, although infrared radiation is preferably used to control the emission of laser light from the pointer, radiation in other portions of the electromagnetic spectrum, including both visible and invisible light, may be used. Additionally, although the infrared radiation emitters preferably emit modulated light signals in order to prevent malfunctioning that may otherwise occur, continuous intensity light signals may also be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A presentation system for a presenter to point out parts of an image projected from a projector onto a projection screen with laser light projected from a laser pointer held by the presenter, the presentation system comprising:
   a laser pointer;
   a receiving unit mounted on a side portion of the laser pointer for detecting a laser light permission signal from a direction to one side of the laser pointer;
   a sending unit separate from the laser pointer for sending said laser light permission signal; and
   a control unit in the laser pointer that requires that said receiving unit receives said laser light permission signal in order for the laser pointer to emit laser light.

2. The presentation system of claim 1, wherein said sending unit is adjustable in order to vary the direction in which said first laser light permission signal is sent to the left and right.

3. The presentation system of claim 1, wherein said laser light permission signal is infrared radiation.

4. A presentation system for a presenter to point out parts of an image projected from a projector onto a projection screen with laser light projected from a laser pointer held by the presenter, the presentation system comprising:
   a laser pointer;
   a receiving unit mounted on a portion of the laser pointer for detecting a laser light permission signal from one direction;
   a sending unit separate from the laser pointer for sending said laser light permission signal; and
   a control unit in the laser pointer that requires that said receiving unit receives said laser light permission signal in order for the laser pointer to emit laser light, wherein:
   the laser pointer has a top portion and a bottom portion; and
   the laser pointer includes safety means for requiring said top portion to be above said bottom portion in order for the laser pointer to emit laser light and for preventing the laser pointer from emitting laser light when said bottom portion is above said top portion.

5. The presentation system of claim 4, wherein said safety means includes a shutter that operates to directly block light produced by the laser pointer when said bottom portion is above said top portion.

6. The presentation system of claim 5, wherein:
   said safety means includes an aperture through which laser light may pass to emit laser light from the laser pointer; and
   said shutter includes an opaque member that is freely movable by its own weight when the laser pointer is turned so that said bottom portion moves above said top portion in order to block an aperture through which laser light might otherwise pass in order to prevent laser light from being emitted from the laser pointer.

7. The presentation system of claim 4, wherein the laser pointer includes a driving circuit for the laser of the laser pointer and a mechanism that provides an electrical signal that turns off the driving circuit of the laser when said bottom portion is above said top portion.

8. The presentation system of claim 7, wherein said mechanism comprises:
   a photocell in the laser pointer;
   an aperture in the laser pointer through which light is directed toward the photocell; and
   an opaque member that, when the laser pointer is turned so that said bottom portion moves above said top portion, is freely movable by its own weight in order to block the passage of light through said aperture.

9. The presentation system of claim 4, wherein said sending unit is adjustable in order to vary the direction in which said first laser light permission signal is sent to the left and right.

10. A presentation system for a presenter to point out parts of an image projected from a projector onto a projection screen with laser light projected from a laser pointer held by the presenter, the presentation system comprising:
   a laser pointer including a right side wall and a left side wall, wherein the laser pointer includes a first receiving unit mounted on a portion of the right side wall of the laser pointer for detecting a first laser light permission signal from a first direction and a second receiving unit mounted on a portion of the left side wall of the laser pointer for detecting a second laser light permission signal from a second direction that is different from said first direction, said second laser light permission signal being different from said first laser light permission signal;

a first sending unit that is separate from the laser pointer for sending said first laser light permission signal in said first direction, and a second sending unit that is separate from the laser pointer for sending said second laser light permission signal in said second direction that is different from said first direction; and a control unit in the laser pointer that requires, in order for the laser pointer to emit laser light, said first receiving unit to receive said first laser light permission signal or said second receiving unit to receive said second laser light permission signal that is different from said first laser light permission signal.

11. The presentation system of claim 10, wherein said first sending unit and said second sending unit are arranged so that, in use in said presentation system, the laser pointer remains between said first sending unit and said second sending unit.

12. The presentation system of claim 11, wherein said laser light permission signal is infrared radiation.

13. A presentation system for a presenter to point out, using laser light projected from a laser pointer, parts of an image projected from a projector onto a projection screen, the presentation system comprising:

a laser pointer that includes a first receiving unit for detecting a first laser light permission signal from a first direction and for detecting a second laser light permission signal from a second direction that is different from said first direction, said second laser light permission signal being different from said first laser light permission signal, and a second receiving unit for detecting said first laser light permission signal and said second laser light permission signal;

a first sending unit that is separate from the laser pointer for sending said first laser light permission signal in said first direction;

a second sending unit that is separate from the laser pointer for sending said second laser light permission signal in said second direction; and a control unit that requires, in order for the laser pointer to emit laser light, that said first receiving unit receives said first laser light permission signal and said second receiving unit does not receive said first light permission signal, or that said second receiving unit receives said second laser light permission signal and said first receiving unit does not receive said second laser light permission signal.

14. The presentation system of claim 13, wherein:

said first sending unit is arranged so as to direct said first light permission signal in said first direction that is generally toward the right side of the projection screen;

said second sending unit is arranged to direct said second light permission signal in said second direction that is generally toward the left side of the projection screen;

said laser pointer includes left and right sides defined on the laser pointer as left and right relative to a presenter who holds the laser pointer in its normal operating position, that is, generally directed toward the position of the projection screen as defined by said first direction and said second direction;

said first receiving unit is positioned on the left side of the laser pointer; and said second receiving unit is positioned on the right side of the laser pointer.

15. The presentation system of claim 14, and further comprising: a projector for projecting the image onto the projection screen, wherein said first sending unit is mounted on the right side of the projector and said second sending unit is mounted on the left side of the projector when the projector is positioned so as to project an image onto the projection screen.

16. The presentation system of claim 14, wherein said laser pointer includes a third receiving unit for receiving either said first laser light permission signal when the laser pointer is pointed generally toward the first sending unit or said second laser light permission signal when the laser pointer is pointed generally toward the second sending unit.

17. The presentation system of claim 16, wherein said control unit prevents the laser pointer from projecting laser light when said third receiving unit receives either said first laser light permission signal or said second laser light permission signal.

18. The presentation system of claim 13, wherein said laser pointer includes a third receiving unit for receiving either said first laser light permission signal when the laser pointer is pointed generally toward the first sending unit, or said second laser light permission signal when the laser pointer is pointed generally toward the second sending unit.

19. The presentation system of claim 18, wherein said control unit prevents the laser pointer from projecting laser light when said third receiving unit receives either said first laser light permission signal or said second laser light permission signal.

20. The presentation system of claim 13, wherein said laser light permission signal is infrared radiation.

* * * * *

UNITED STATES PATENT AND TRADEMARK OFFICE
CERTIFICATE OF CORRECTION

PATENT NO. : 6,761,456 B2
DATED : July 13, 2004
INVENTOR(S) : Hamana et al.

It is certified that error appears in the above-identified patent and that said Letters Patent is hereby corrected as shown below:

Column 3,
Line 31, change "oil" to -- on --;

Column 6,
Line 36, change "in fared" to -- infrared --

Column 7,
Line 56, change "pointer. however" to -- pointer. However, --;

Column 8,
Line 22, change "oil" to -- on --; and

Column 11,
Line 21, change "call" to -- can --.

Signed and Sealed this

First Day of February, 2005

JON W. DUDAS
*Director of the United States Patent and Trademark Office*